(12) United States Patent
Koyanagi et al.

(10) Patent No.: US 6,765,331 B2
(45) Date of Patent: Jul. 20, 2004

(54) ECCENTRIC ROTOR HAVING HIGH DENSITY MEMBER, MANUFACTURING METHOD THEREOF, AND FLAT CORELESS VIBRATOR MOTOR USING THE ECCENTRIC ROTOR

(75) Inventors: Naohisa Koyanagi, Isesaki (JP); Kenji Oya, Isesaki (JP)

(73) Assignee: Tokyo Parts Industrial Co., Ltd., Isesaki (JP)

(*) Notice: Subject to any disclaimer, the term of this patent is extended or adjusted under 35 U.S.C. 154(b) by 183 days.

(21) Appl. No.: 10/185,016

(22) Filed: Jul. 1, 2002

(65) Prior Publication Data

US 2003/0001451 A1 Jan. 2, 2003

(30) Foreign Application Priority Data

Jun. 29, 2001 (JP) ........................................ 2001-199603
Jun. 29, 2001 (JP) ........................................ 2001-199604

(51) Int. Cl.[7] .............................................. H02K 1/22
(52) U.S. Cl. ........................ 310/268; 310/81; 310/71; 310/237; 29/597
(58) Field of Search ........................... 310/268, 81, 71, 310/90, 43, 233, 234, 235, 237; 29/596, 597, 598

(56) References Cited

U.S. PATENT DOCUMENTS 3,348,086 A * 10/1967 Hiroshi ........................ 310/268
3,993,920 A * 11/1976 Sato ............................ 310/66
4,374,336 A * 2/1983 Shimizu ................. 310/154.05
4,420,875 A * 12/1983 Coquillart ..................... 29/597
5,036,239 A    7/1991 Yamaguchi
5,107,155 A    4/1992 Yamaguchi
5,625,240 A * 4/1997 Bernus ....................... 310/90.5
5,793,133 A * 8/1998 Shiraki et al. ................ 310/81
6,051,900 A * 4/2000 Yamaguchi ................... 310/81
6,541,891 B2 * 4/2003 Yamaguchi ................. 310/268

FOREIGN PATENT DOCUMENTS

JP          08-256449      1/1996

* cited by examiner

Primary Examiner—Thanh Lam
(74) Attorney, Agent, or Firm—Robert E. Bushnell, Esq.

(57) ABSTRACT

An eccentric rotor having a high density member includes a rotor base having an air-core armature coil installation surface, a bearing holder provided at a center thereof, and an air-core armature coil position determination guide formed of a high density member including metal, having a specific gravity of 6 or more and arranged to be eccentric outside of the bearing holder, an air-core armature coil arranged at the air-core armature coil position determination guide, a printed wired commutator member installed to insulate a conductive portion having electric potential from the high density member, and an end connection pattern, in which ends of the air-core armature coil are connected, installed at the printed wired commutator member inside an outer circumference of rotation at a position not overlapping the air-core armature coil.

20 Claims, 7 Drawing Sheets

ECCENTRIC ROTOR HAVING HIGH DENSITY MEMBER, MANUFACTURING METHOD THEREOF, AND FLAT CORELESS VIBRATOR MOTOR USING THE ECCENTRIC ROTOR

CLAIM OF PRIORITY

This application makes reference to, incorporates the same herein, and claims all benefits accruing under 35 U.S.C. §119 from our two applications ECCENTRIC ROTOR HAVING HIGH DENSITY MEMBER, MANUFACTURING METHOD THEREOF, AND FLAT CORELESS VIBRATOR MOTOR USING THE ECCENTRIC ROTOR filed with the Japanese Patent Office on Jun. 29, 2001, and duly assigned serial Nos. 2001-199603 and 2001-199604.

BACKGROUND OF THE INVENTION

1. Technical Field

The present invention relates to an eccentric rotor having a high density member for a vibrator motor as a silent call means of a portable communications device, a manufacturing method thereof, and a flat coreless vibrator motor using the eccentric rotor.

2. Related Art

As silent call means of portable communications devices such as pagers or mobile phones, as shown in FIG. 8, an eccentric weight W formed of tungsten alloy is arranged at an output shaft S of a cylindrical DC motor M and vibration is generated by using a centrifugal force of the eccentric weight W during rotation.

However, adding the eccentric weight W at the output shaft S as above limits its design due to a space in which the eccentric weight W rotates. Also, since tungsten alloy which is expensive is used, a manufacturing cost increases.

Thus, the present applicant proposed to remove the output shaft and make the included rotor itself eccentric. A flat motor is disclosed in Japanese Patent Publication No. hei 8-10972 (U.S. Pat. No. 5,036,239 and Canada Patent No. 2,017,395). A cylindrical coreless vibrator motor is disclosed in Japanese Patent Application No hei 2-309070 (U.S. Pat. No. 5,107,155).

In these motors, since no output shaft and eccentric weight are provided, there is no limit to design, it is easy to use, and no danger exists during rotation.

Since an output shaft is not needed, the vibrator motor including an eccentric rotor is a so-called shaft fixed type motor in which a shaft is fixed to a housing. The shaft fixed type motor is proposed by the present applicant in Japanese Patent Publication No. hei 6-81443 and Japanese Patent No. 2,872,623.

Since the above motors have very thin coreless coils, they should be handled carefully. Also, since all the motors need molding processes, the number of parts or processing steps increase.

Recently, as portable devices are made smaller, more compact vibrator motors are required. For a flat type motor, a motor having a diameter less than 10 mm is required. With the above size motor, a sufficient vibration amount cannot be obtained since the amount of movement of the center of gravity in a radial direction obtained by simply making air-core armature coils eccentric is not great.

As a result, a resin which has a high density by increasing the amount of mixture of tungsten alloy must be used. However, in this case, since a value of resistance of a resin portion is lowered, unnecessary current flows through the resin portion and thus consumption of current increases.

SUMMARY OF THE INVENTION

To solve the above-described problems, it is an object of the present invention to provide an eccentric rotor having a high density member suitable for a vibrator motor which is ultra-compact and simultaneously provides a great amount of movement of the center of gravity in a radial direction so that a desired vibration amount can be obtained and further secures insulation between an air-core armature coil or printed wired commutator and resin so that consumption of current is not scarified while employing a high density member comprising metal.

It is another object of the present invention to provide a method of manufacturing the above eccentric rotor.

It is yet another object of the present invention to provide a flat coreless vibrator motor adopting the above eccentric rotor.

It is still an object of the present invention to provide a bearing for the rotor having a low coefficient of dynamic friction.

To achieve the above object, there is provided an eccentric rotor having a high density member comprising a rotor base having an air-core armature coil installation surface, a bearing holder provided at a center thereof, and an air-core armature coil position determination guide formed of a high density member including metal, having a specific gravity of 6 or more and arranged to be eccentric outside of the bearing holder, an air-core armature coil arranged at the air-core armature coil position determination guide, a printed wired commutator member installed to insulate a conductive portion having electric potential from the high density member, and an end connection pattern, in which ends of the air-core armature coil are connected, installed at the printed wired commutator member inside an outer circumference of rotation at a position not overlapping the air-core armature coil. In this case, a desired amount of vibration can be obtained by sufficiently securing the amount of movement of the center of gravity in a radial direction while the eccentric rotor is ultra-small.

In the first embodiment of the present invention, the bearing holder and the air-core armature coil position determination guide are formed of resin including tungsten alloy, having a density of 6 through 10 and a dynamic friction coefficient of 0.5 (1.5 kg/cm$^2$) or less, and the resin itself functions as a bearing. In this case, the resin itself can work as a bearing. Accordingly, it is unnecessary to provide with an additional bearing.

In the second embodiment of the present invention, the bearing holder and the air-core armature coil position determination guide are formed of resin including tungsten alloy, having a density of 6 or more, and an additional bearing is arranged at a center of the bearing holder. In this embodiment, an eccentric rotor having a low dynamic friction coefficient can be realized while using a bearing holder having a high specific gravity and a high density. In this embodiment, the additional bearing is a metal sintered oilless bearing which is integrally formed with the bearing holder.

It is preferred in the present invention that the air-core armature coil position determination guide guides by using an inner or outer diameter of the air-core armature coil, and an air-core armature coil end guiding portion of the air-core armature coil is provided inside the outer circumference of rotation. In this case, the determination of the position of the air-core armature coil is made easy and a problem of disconnection of the end of the air-core armature coil does not occur.

To achieve the second object according to the first embodiment of the present invention, there is provided a method of manufacturing an eccentric rotor comprising the steps of molding a rotor base which includes an air-core armature coil installation surface, a bearing holder at a center thereof, and an air-core armature coil position determination guide formed of a high density member, including metal having a specific gravity of 6 or more and arranged to be eccentric outside of the bearing holder, arranging the air-core armature coil at the air-core armature coil position determination guide, installing a printed wired commutator member at the rotor base such that a conductive portion having electric potential is insulated from the high density member, connecting ends of the air-core armature coil to an end connection pattern installed at the printed wired commutator member and inside an outer circumference of rotation at the position not overlapping the air-core armature coil.

To achieve the second object according to the second embodiment according to the present invention, the above eccentric rotor can be manufactured by a method which comprises the steps of forming an eccentric rotor base by integrally molding a bearing holder at a center thereof and an air-core armature coil position determination guide outside the bearing holder by using a high density member including metal having a specific gravity of 6 or more which is the same as the bearing holder, arranging a sintered oilless bearing at the center of the rotor base, inserting an air-core armature coil around the air-core armature coil position determination guide, installing a printed wired commutator member such that a conductive portion having electric potential does not contact the rotor base, and connecting ends of the air-core armature coil to an end connection pattern installed at the printed wired commutator member and inside an outer circumference of rotation at the position not overlapping the air-core armature coil.

To achieve the third object, there is provided a flat coreless vibrator motor comprising an eccentric rotor comprising a rotor base having an air-core armature coil installation surface, a bearing holder provided at a center thereof, and an air-core armature coil position determination guide formed of a high density member, including metal having a specific gravity of 6 or more and arranged to be eccentric outside of the bearing holder, an air-core armature coil arranged at the air-core armature coil position determination guide, a printed wired commutator member installed to insulate a conductive portion having electric potential from the high density member, and an end connection pattern, in which ends of the air-core armature coil are connected, installed at the printed wired commutator member inside an outer circumference of rotation at a position not overlapping the air-core armature coil, a magnet installed to face the eccentric rotor with a gap, a brush arranged inside the magnet for providing electric power to the eccentric rotor, a shaft for rotatably supporting the eccentric rotor, and a housing for housing the eccentric rotor, the magnet, the brush, and the shaft.

It is preferred in the present invention that the eccentric rotor is assembled such that the air-core armature coil faces the magnet.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference numerals indicate the same or similar components, and wherein.

DETAILED DESCRIPTION OF THE INVENTION

Figure 1:
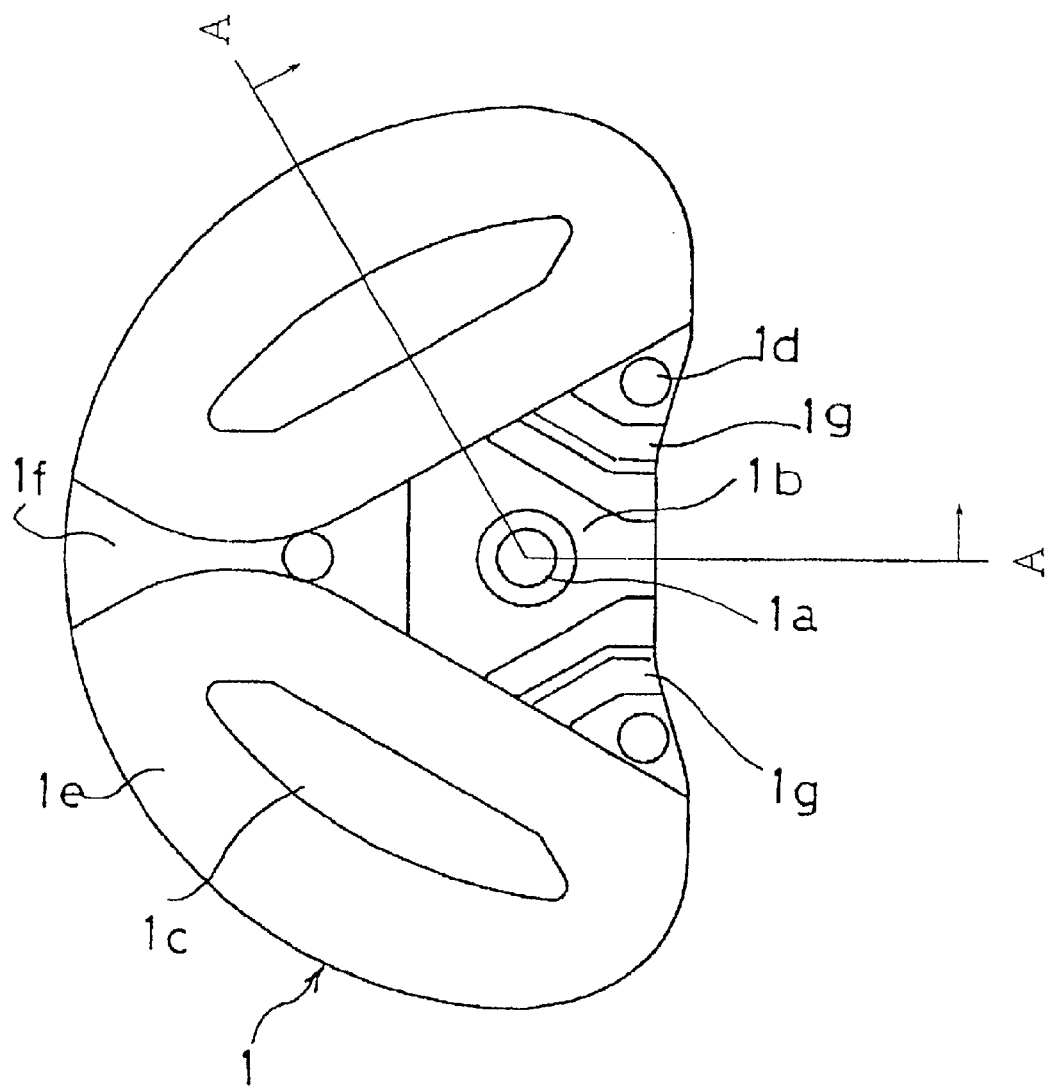
FIG. 1 is a plan view of a rotor base constituting an eccentric rotor as a preferred embodiment of the eccentric rotor having a printed wired commutator member of the present invention.
Figure 2:
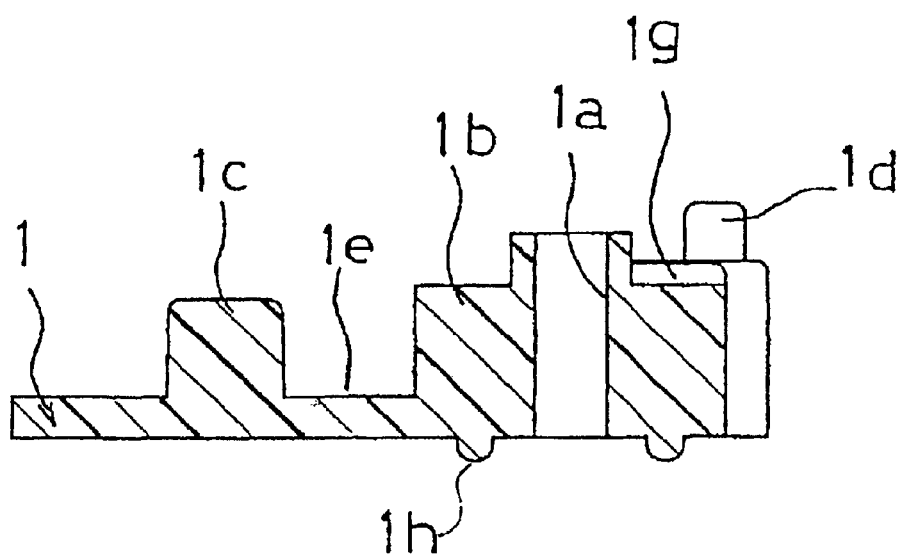
FIG. 2 is a sectional view taken along line A—A of FIG. 1.

In FIGS. 1 and 2, reference numeral 1 denotes a rotor base formed of high density slippery resin which is a mixture of tungsten alloy and polyamide and has a specific gravity of 8, a dynamic friction coefficient of about 0.4 (1.5 kg/cm$^2$). The rotor base 1 is injection-molded to include all of a bearing holder 1$b$ having a bearing hole 1$a$ formed at the center thereof, two aircore armature coil position determination guides 1$c$ arranged outside the bearing holder 1$b$, and three poles 1$d$ where printed wired commutators that are described later are installed. The rotor base 1 has an air-core armature coil installation surface 1$e$ where air-core armature coils that are described later are installed around the two air-core armature coil position determination guides 1$c$, and a weight portion 1$f$ having a gingko leaf shape where the position of part of the outer diametric portion of the air-core armature coil is determined when the air-core armature coil is installed. Also, the outer diametric portion of the bearing holder 1$b$ restricts the position of the air-core armature coil when the air-core armature coil is installed. Likewise, the outer diametric portion may be used as the air-core armature coil position determination guide.

In the drawing, reference numeral 1$g$ denotes an air-core armature coil end guiding groove arranged at the bearing holder 1$b$, and reference numeral 1$h$ denotes a dam portion which sliding-contacts a case 4 that is part of a housing H when the rotor base 1 completed as an eccentric rotor to be described later is assembled to a motor.

The high density member can be formed to exhibit a specific gravity of 8 to 14.5. When the specific gravity of the high density member is less than 8, the amount of tungsten alloy employed decreases. Accordingly, in the first embodiment of the present invention, since a dynamic friction coefficient of about 0.4 (1.5 kg/cm$^2$) can be obtained, the high density member can directly support a rotation shaft without using a sintered oilless bearing.

Figure 3:
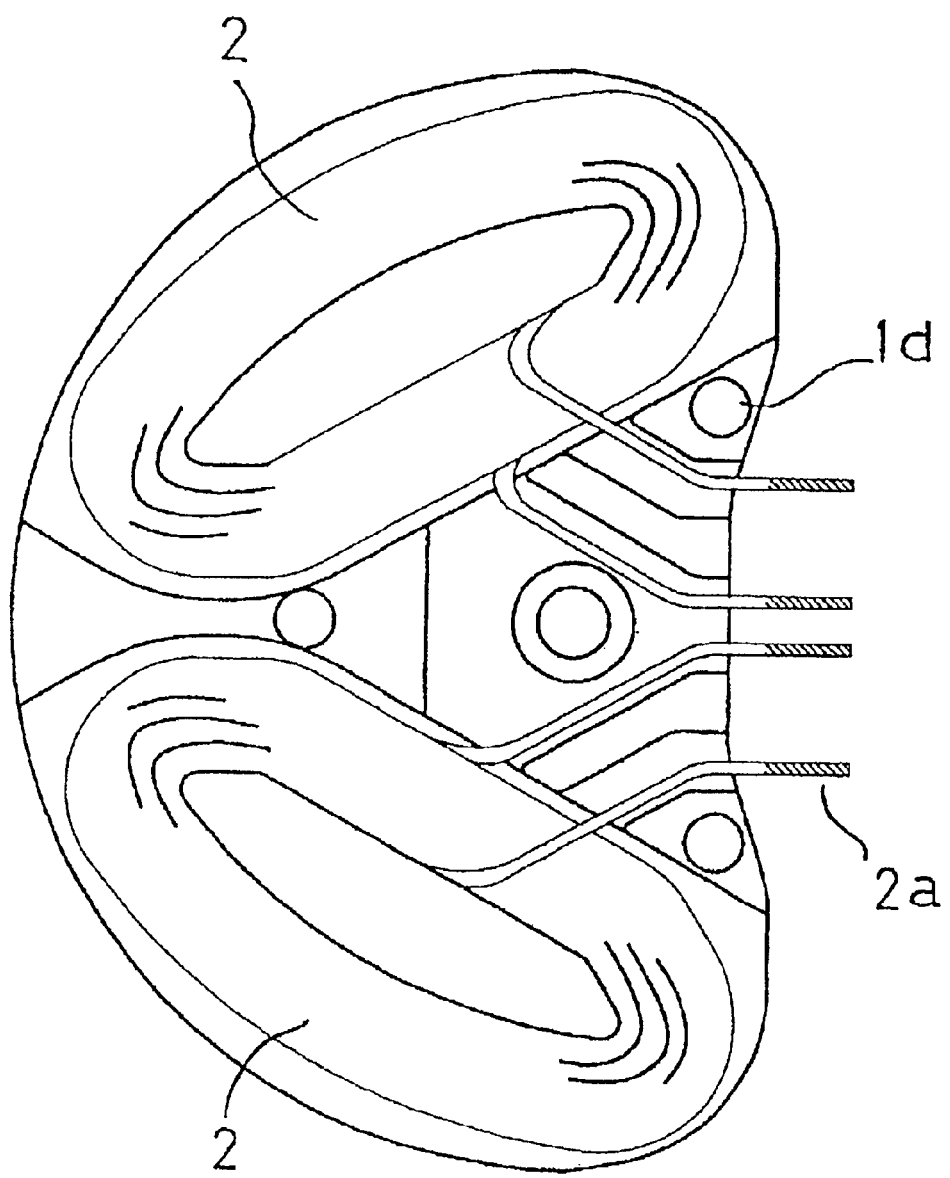
FIG. 3 is a plan view in a state in which an air-core armature coil is installed at the rotor base of FIG. 1.
Figure 4:
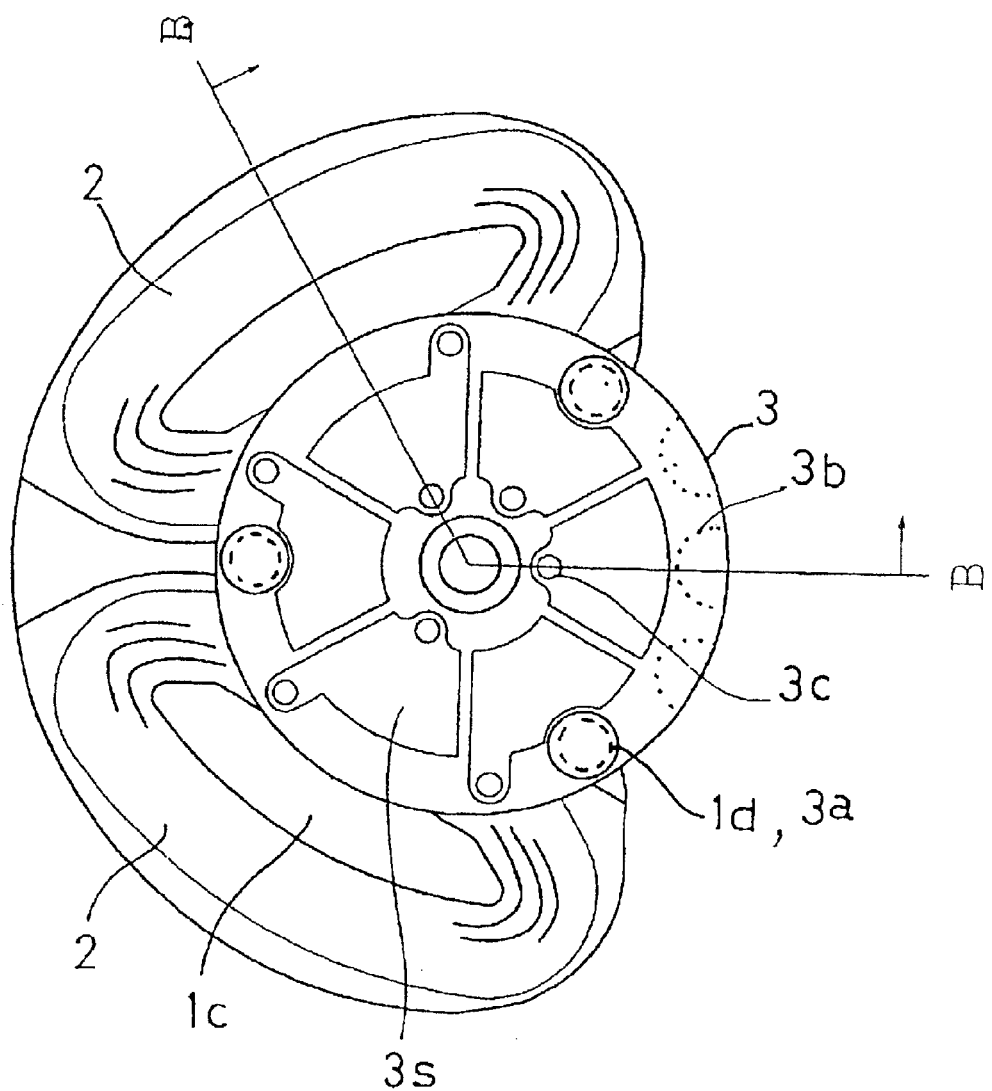
FIG. 4 is a plan view of the eccentric rotor in a completed state.
Figure 5:
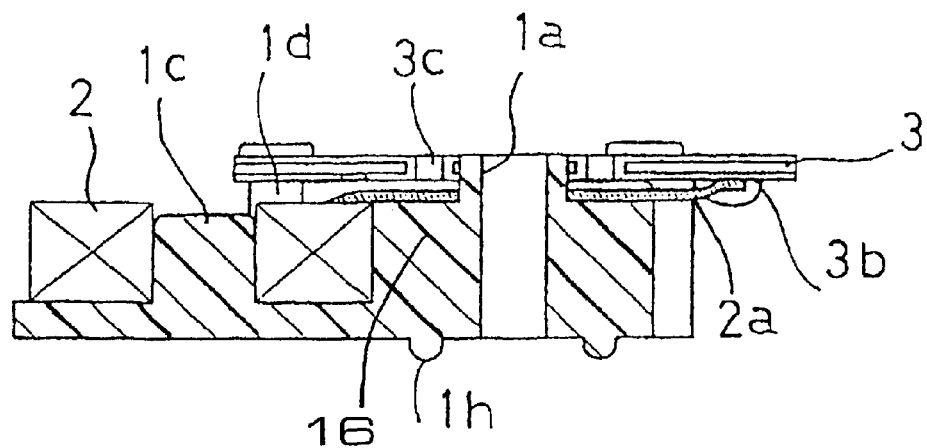
FIG. 5 is a sectional view taken along line B—B of FIG. 4 according to the first embodiment of the present invention.

To manufacture an eccentric rotor by using the rotor base 1 according to the first embodiment of the present invention, first, an air-core armature coil 2 is inserted around the air-core armature coil position determination guide 1c of the rotor base 1, as shown in FIG. 3. The air-core armature coil 2 is fixed by melting the upper portion of the air-core armature coil position determination guide 1c or coating the air-core armature coil installation surface 1e with an adhesive. Then, as shown in FIGS. 4 and 5, a printed wired commutator member 3 is fixed by inserting a pole passing hole 3a around the pole 1d in a state of avoiding a portion having an electric potential to insulate from the high density member and melting the upper portion of the pole 1d. Ends 2a of the air-core armature coil 2 are connected to an end connection pattern 3b disposed on the printed wired commutator member 3. End connection pattern 3b is not disposed at location that overlaps air-core armature coil 2. End connection pattern 3b is also disposed at a location opposite the center of gravity of the rotor while being inside the outer circumference of rotation. End connection pattern 3b is disposed on a surface of printed wired commutation member 3 that is opposite to a surface of printed wired commutation member 3 where segments 3s are located.

Here, the printed wired commutator member 3 has a shaft insertion hole at the center thereof and is formed circular viewed from the above. Six segments 3s having surfaces processed with noble metals and forming a flat commutator are arranged on one side of the printed wired commutator member 3. A conductive body electrically connecting the segments 3s facing each other through through holes 3c formed at the rear surface of the printed wired commutator member 3.

Figure 6:
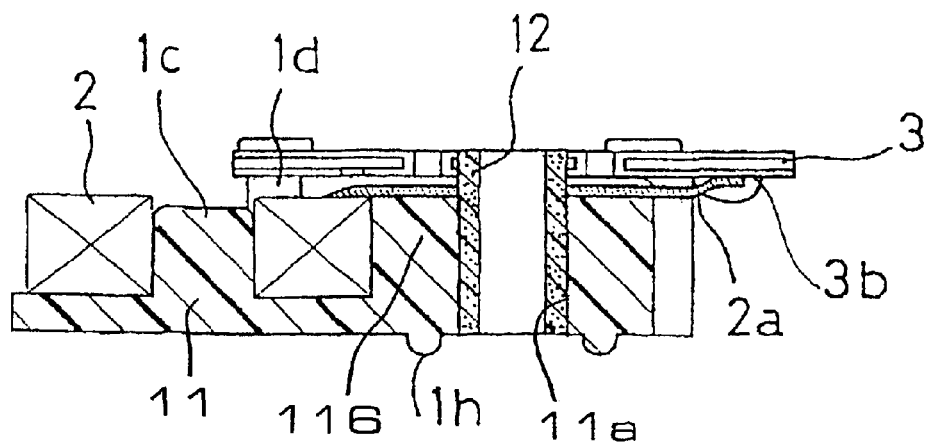
FIG. 6 is a sectional view of an example of a eccentric rotor according to the second embodiment of the present invention.

FIG. 6 shows an example of a modified eccentric rotor according to the second embodiment of the present invention. In this embodiment, to increase a centrifugal force, the rotor base 11 is formed of high density resin having a specific gravity of 10 in which the amount of tungsten alloy is increased. Here, reference numeral 12 denotes a sleeve type sintered oilless bearing inserted in a bearing installation hole 11a (refer to FIG. 5) which is enlarged. The sleeve type sintered oilless bearing 12 is inserted because, since the resin forming the rotor base 11 is a high density resin having a specific gravity of 10 in which the amount of tungsten alloy is increased, when this resin also functions as a sliding bearing, a dynamic friction coefficient increases and the shaft is abraded and bearing loss is generated. Therefore, sintered oilless bearing 12 is employed to reduce friction when the tungsten composition is high as in the second embodiment.

The method of manufacturing the eccentric rotor according to the first embodiment of the present invention is summarized as follows:

(1) A rotor base 1 is molded which includes an air-core armature coil installation surface 1e, a bearing holder 1b at the center thereof, and an air-core armature coil position determination guide 1c comprising metal, the rotor base 1 having a specific gravity of 6 or more and formed of a high density member arranged to be eccentric at the outside of the bearing holder 1b.

(2) The air-core armature coil 2 is arranged at the air-core armature coil position determination guide 1c and fixed by melting the upper portion of the guide 1c or using an adhesive in advance.

(3) The printed wired commutator member 3 is inserted around the respective poles 1d and fixed by crushing the upper portion of each pole 1d. The fixing step is performed so that a conductive portion of the commutator member 3 having electric potential is electrically insulated from the high density member.

(4) The ends 2a of the air-core armature coil are connected to an end connection pattern 3b disposed on the printed wired commutator member 3 inside the outer circumference of rotation at a location that does not overlap the air-core armature coil 2, thus completing an eccentric rotor.

In manufacturing the rotor according to the second embodiment of the present invention, a sleeve type oilless bearing 12 is formed inside bearing holder 11b of rotor base 11 as illustrated in FIG. 6.

Figure 7:
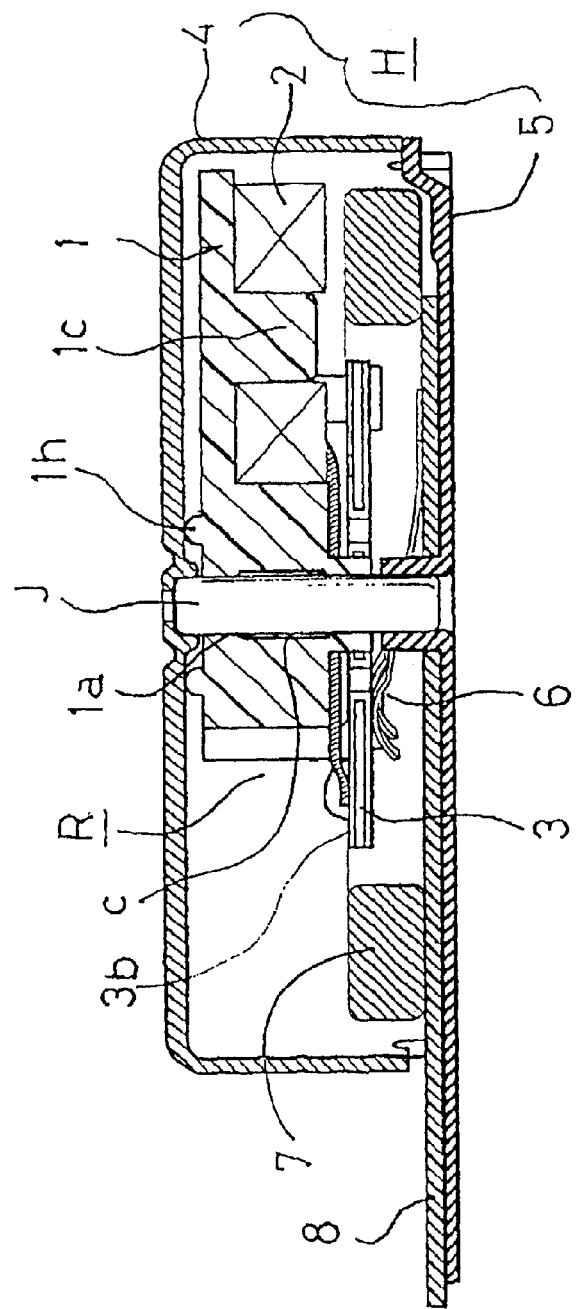
FIG. 7 is a vertical sectional view of a flat coreless vibrator motor, taken along line B—B of the eccentric rotor of FIG. 4.
Figure 8:
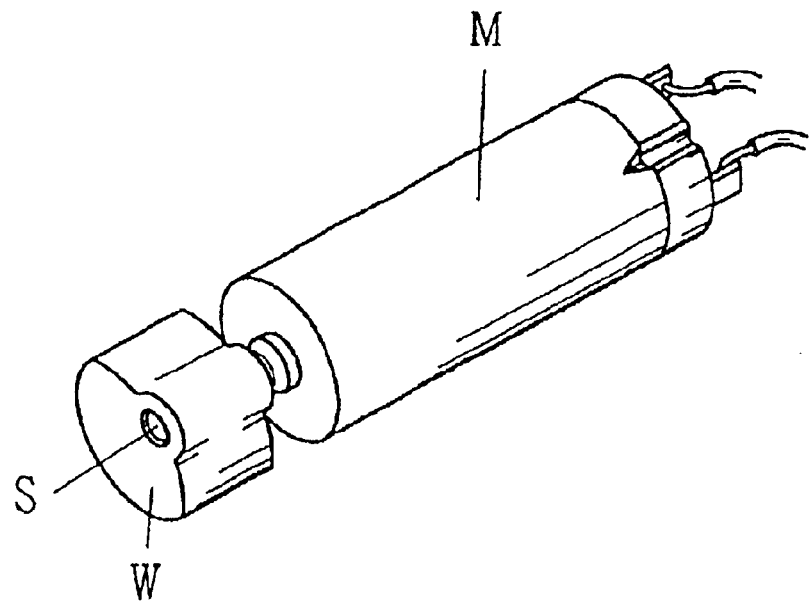
FIG. 8 is a perspective view of a vibrator motor.

A flat coreless vibrator motor adopting the eccentric rotor R is shown in FIG. 7. The eccentric rotor R is housed in a housing H formed of a case 4 and a bracket 5. The eccentric rotor R is inserted around a shaft J fixed at the center of the bracket 5 to be capable of rotating through the bearing hole 1a. The eccentric rotor R receives electric power through a brush 6 arranged at the bracket 5 and contacting the printed wired commutator member to be capable of sliding and is driven by a flat magnet 7. Since the bearing hole 1a has a middle recess portion c of several micrometers formed in the middle thereof, frictional bearing loss is reduced. The middle recess portion c can be easily formed by using a difference in the contraction rate of resin since the middle portion of the resin bearing holder 1b is thick, as shown in FIG. 5. Also, the bearing hole 1a including the middle recess portion c can be formed by using a mold pin having a shape corresponding to the middle recess portion of several micrometers and being forcibly detached from the bearing hole 1a after molding. In FIG. 7, reference numeral 8 denotes a brush base formed of epoxy base having a thickness of 0.1 mm for providing electric power from the outside, where the brush 6 is installed.

As described above, in the eccentric rotor according to the present invention, a desired amount of vibration can be obtained by sufficiently securing the amount of movement of the center of gravity in a radial direction while the eccentric rotor is ultra-small. Although the high density member including metal is used, insulation between the air-core armature coil or printed wired commutator and resin can be obtained. Also, the air-core armature coil can be easily installed and the ends of the coil can be processed so that electrical contact with the end connection pattern of the commutator member is maintained. Thus, a compact flat vibrator motor can be provided at a low price.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. An eccentric rotor having a high density member, comprising:

a rotor base having an air-core armature coil installation surface, a bearing holder provided at a center thereof, and an air-core armature coil position determination guide formed of a high density member comprising metal and having a specific gravity of 6 or more and arranged to be eccentric outside of the bearing holder;

an air-core armature coil arranged at the air-core armature coil position determination guide, said air-core armature coil having a coil portion and electrical leads electrically connected to and protruding from said coil portion of said air-core armature coil; and a printed wired commutator member installed to electrically insulate a conductive portion thereof from said rotor base, said printed wired commutator member comprising an end connection pattern, said end connection pattern being electrically connected to said electrical leads of said air-core armature coil, said end connection pattern of the printed wired commutator member being disposed inside an outer circumference of rotation of said rotor and being disposed at a position not overlapping said coil portion of the air-core armature coil.

2. The eccentric rotor of claim 1, the bearing holder and the air-core armature coil position determination guide are formed of a homogenous resin comprising tungsten alloy, said resin having a specific gravity of 6 or more and a dynamic friction coefficient of 0.5 (1.5 kg/cm$^2$) or less, and the resin itself functions as a bearing, said bearing being in contact with and rotating about a stationary shaft.

3. The eccentric rotor of claim 1, a bearing installation hole, the bearing holder and the air-core armature coil position determination guide are formed of a homogenous resin comprising tungsten alloy, said resin having a specific gravity of 6 or more, said rotor further comprising a bearing made of a material other than said resin and being disposed in said bearing installation hole.

4. The eccentric rotor of claim 3, the bearing being a metal sintered oilless bearing shaped as a sleeve inside said bearing installation hole.

5. The eccentric rotor of claim 1, the air-core armature coil position determination guide guides by using an inner diameter of said coil portion of the air-core armature coil, and an air-core armature coil end guiding portion of the air-core armature coil being provided inside the outer circumference of rotation of said rotor.

6. The eccentric rotor of claim 1, the air-core armature coil position determination guide guides by using an outer diameter of said coil portion of the air-core armature coil, and an air-core armature coil end guiding portion of the air-core armature coil being provided inside the outer circumference of rotation of said rotor.

7. A method of manufacturing an eccentric rotor, said method comprising the steps of:

molding a rotor base comprising an air-core armature coil installation surface, a bearing holder at a center thereof, and an air-core armature coil position determination guide, said rotor base comprised of high density material comprising metal and having a specific gravity of 6 or more and arranged to be eccentric around the bearing holder;

attaching an air-core armature coil at the air-core armature coil position determination guide;

attaching a printed wired commutator member to the rotor base fitted with said air-core armature coil, said printed wired commutator member having a conductive portion being electrically insulated from the rotor base; and electrically and physically connecting ends of the air-core armature coil protruding from a coil portion of said air-core armature coil to a conductive end connection pattern disposed on the printed wired commutator member, said connecting ends and said connection pattern being inside an outer circumference of rotation of said rotor and at position not overlapping the coil portion of said air-core armature coil.

8. A method of manufacturing an eccentric rotor, comprising the steps of:

forming an eccentric rotor base by integrally molding a bearing holder comprising a bearing installation hole at a center thereof and an air-core armature coil position determination guide outside the bearing holder by using a high density material comprising metal and having a specific gravity of 6 or more;

attaching a sintered oilless bearing within said bearing installation hole of said rotor base;

attaching an air-core armature coil around the air-core armature coil position determination guide;

attaching a printed wired commutator member to said rotor base having said air-coil armature coil attached thereto, said printed wired commutator member comprising a conductive portion that remains electrically insulated from said rotor base; and connecting, both physically and electrically, ends of the air-core armature coil to an end connection pattern of said printed wired commutator member, said connecting ends protruding from a coil portion of said air-core armature coil and being electrically connected to said end connection pattern at a location inside an outer circumference of rotation of said rotor and at a position not overlapping the coil portion of said air-core armature coil.

9. A flat coreless vibrator motor, comprising:

an eccentric rotor comprising a rotor base having an air-core armature coil installation surface, a bearing holder provided at a center thereof, and an air-core armature coil position determination guide formed of a high density material comprising metal and having a specific gravity of 6 or more and arranged to be eccentric outside of the bearing holder, an air-core armature coil arranged at the air-core armature coil position determination guide, a printed wired commutator member installed to electrically insulate a conductive portion of said printed wired commutator member from the rotor base, said printed wired commutator member comprising an end connection pattern that is electrically connected to leads protruding from a coil portion of the air-core armature coil said electrical connection being disposed inside an outer circumference of rotation of said rotor and at a position not overlapping the coil portion of said air-core armature coil;

a magnet installed to face the eccentric rotor with a gap;

a brush arranged inside the magnet for providing electric power to the eccentric rotor;

a shaft for rotatably supporting the eccentric rotor; and a housing for housing the eccentric rotor, the magnet, the brush, and the shaft.

10. The motor of claim 9, the bearing holder and the air-core armature coil position determination guide are formed of resin comprising tungsten alloy and having a specific gravity of 6 or more and a dynamic friction coefficient of 0.5 (1.5 kg/cm$^2$) or less, and the resin itself functions as a sliding bearing when rotated about said shaft.

11. The motor of claim 9, the bearing holder and the air-core armature coil position determination guide are formed of resin comprising a tungsten alloy and having a specific gravity of 6 or more, said bearing holder being perforated by a bearing installation hole that accommodates a bearing.

12. The motor of claim 11, the bearing being sleeve-shaped and comprised of a metal sintered oilless material formed within said bearing installation hole.

13. The motor of claim 9, the air-core armature coil position determination guide guides by using an inner diameter of the coil portion of said air-core armature coil, and an air-core armature coil end guiding portion of the air-core armature coil is provided inside the outer circumference of rotation of said rotor.

14. The motor of claim 9, the air-core armature coil position determination guide guides by using an outer diameter of the coil portion of said air-core armature coil, and an air-core armature coil end guiding portion of the air-core armature coil is provided inside the outer circumference of rotation of said rotor.

15. The motor of claim 9, the eccentric rotor is assembled such that the air-core armature coil faces the magnet.

16. The motor of claim 11, the eccentric rotor is assembled such that the air-core armature coil faces the magnet.

17. The rotor of claim 3, said rotor base having a specific gravity in excess of 10, said bearing being sleeve-shaped and fitted inside said bearing installation hole.

18. The motor of claim 11, said rotor base having a specific gravity in excess of 10 and formed of a homogenous material.

19. The method of claim 7, said rotor base being manufactured by injection molding.

20. The method of claim 8, said rotor base being manufactured by injection molding, said rotor base having a specific gravity of at least 10.

* * * * *